April 5, 1949.  V. R. SWIFT ET AL  2,466,620
ROTATING BLADE GRASS AND WEED CUTTER
Filed Aug. 12, 1947  3 Sheets-Sheet 1
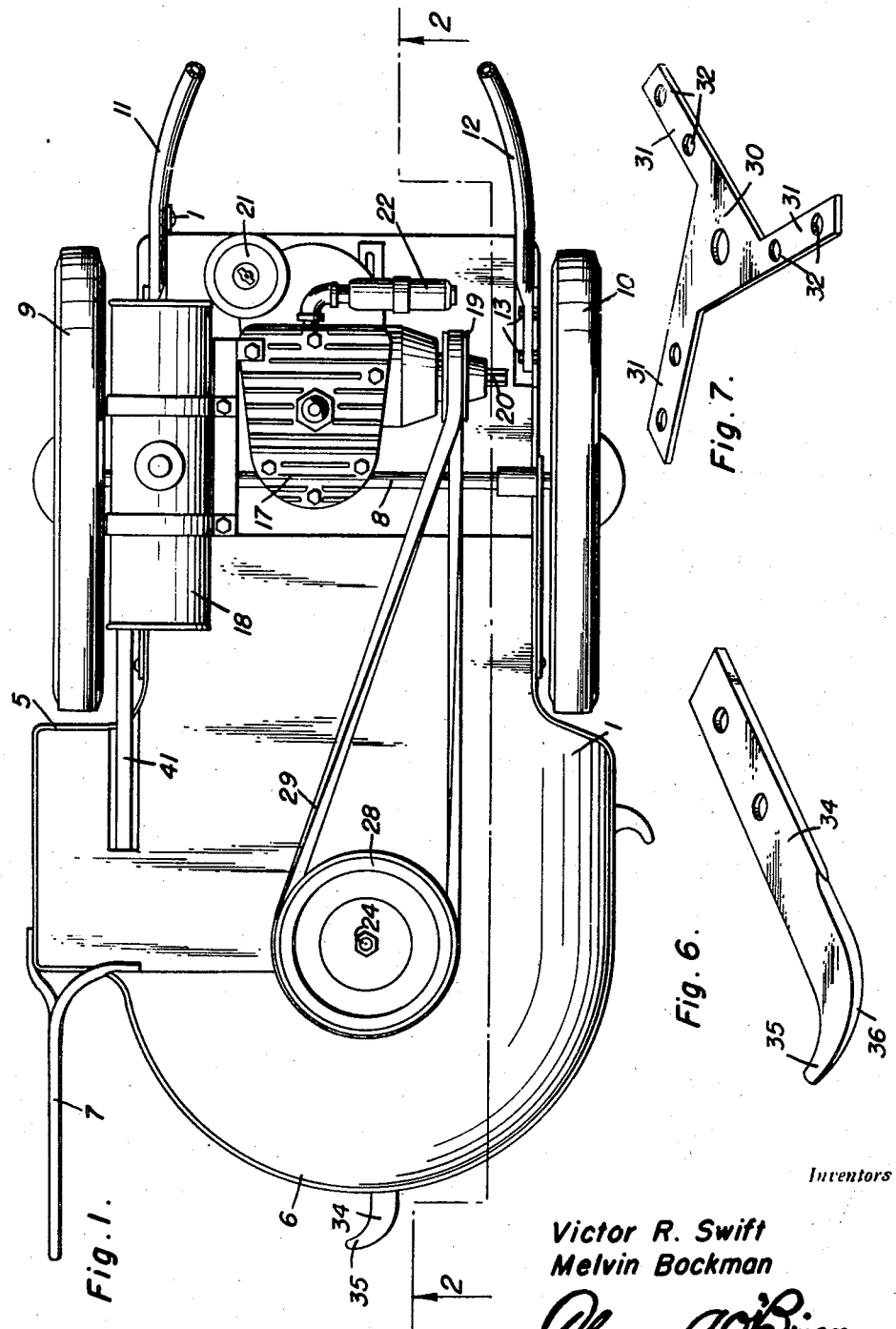
Inventors
Victor R. Swift
Melvin Bockman
Clarence A. O'Brien
and Harvey B. Jacobson
Attorneys

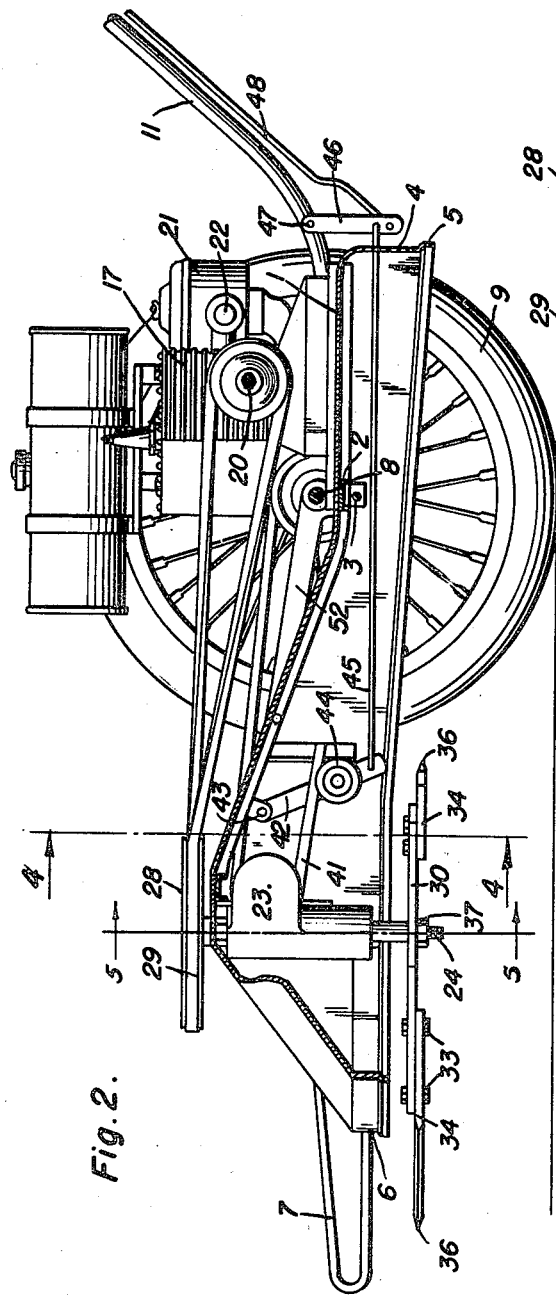

April 5, 1949.  V. R. SWIFT ET AL  2,466,620
ROTATING BLADE GRASS AND WEED CUTTER
Filed Aug. 12, 1947  3 Sheets-Sheet 3
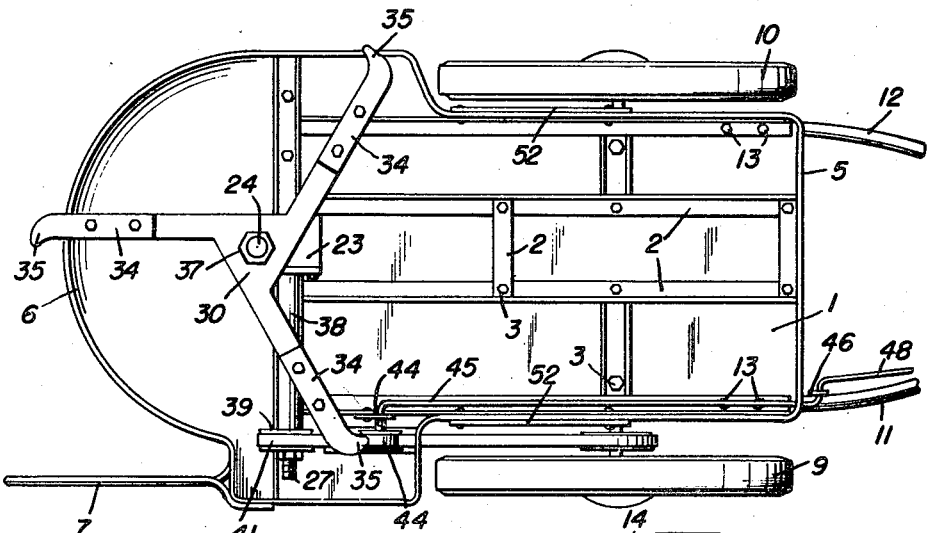
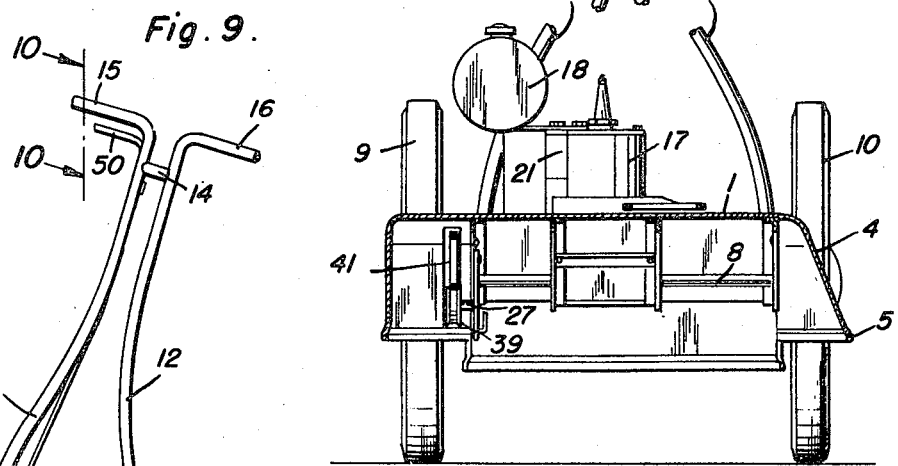
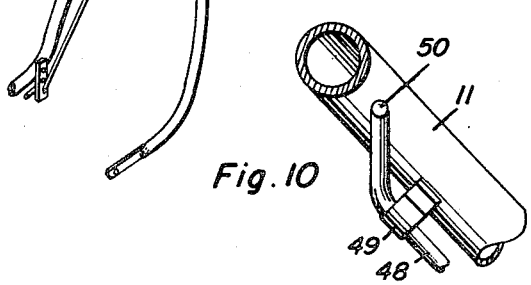
Inventors
Victor R. Swift
Melvin Bockman Patented Apr. 5, 1949

2,466,620

UNITED STATES PATENT OFFICE 2,466,620

ROTATING BLADE GRASS AND WEED CUTTER

Victor R. Swift and Melvin Bockman, Pontiac, Ill.

Application August 12, 1947, Serial No. 768,240

3 Claims. (Cl. 56—25.4)

This invention relates to improvements in rotating blade grass and weed cutter.

An object of the invention is to provide an improved power operated and propelled rotating blade grass and weed cutter.

Another object of the invention is to provide an improved wheel supported power operated and propelled rotating blade grass and weed cutter.

A further object of the invention is to provide an improved wheel supported power operated and propelled rotating multiple blade grass and weed cutter whose blades are mounted on a vertical spindle for vertical adjustment with respect to the ground for cutting various heights of grass and weeds.

A still further object of the invention is to provide an improved wheel supported gasoline motor operated and propelled rotating multiple and interchangeable blade grass and weed cutter.

Another object of the invention is to provide an improved rotating blade grass and weed cutter which will be highly efficient in operation and relatively inexpensive to manufacture and produce.

Other objects will appear as the description proceeds.

In the accompanying drawings which form a part of this application:

Figure 1 is a top plan view of the improved rotating blade grass and weed cutter;

Figure 2 is a side elevation of the improved rotating blade grass and weed cutter taken on line 2—2 of Figure 1;

Figure 3 is a bottom plan view of the improved rotating blade grass and weed cutter;

Figure 4 is a partial sectional view taken on the line 4—4 of Figure 1;

Figure 5 is a sectional view taken on the line 5—5 of Figure 2;

Figure 6 is a perspective view of one of the interchangeable cutter blades;

Figure 7 is a perspective view of the cutter blade supporting bracket;

Figure 8 is a detail view of the adjusting means for varying the cutting height of the cutter blades;

Figure 9 is a perspective view of the handle bar and driving control for the belt tightener, and Figure 10 is a partial sectional view taken on the line 10—10 of Figure 9.

Like characters of reference are used throughout the following specification and the accompanying drawings to designate corresponding parts.

In carrying out the invention, there is provided an elongated metal body generally denoted by the reference numeral 1 preferably made as a casting, and reinforced on its lower side by the angle iron bracing strips 2 secured in position by means of the fasteners 3.

The body 1 is provided with a depending skirt 4 which is formed with a reinforcing bead 5 about its lower end.

The forward end of the body 1 is rounded as at 6 to form a housing or guard for the rapidly rotating cutter blades later to be described.

A wire guard arm 7 will be attached to the right front side of the body 1 to protect objects from being struck by the blades and for directing high grass and weeds to the rotating cutter blades.

The body 1 will be provided with a transverse axle 8 upon whch the oppositely disposed rubber tired wheels 9 and 10 will be secured.

Upwardly extending oppositely disposed handle bars 11 and 12 will be attached by means of the bolts 13 to the opposite sides of the rear end of the body 1, and will be secured together by the cross brace 14 welded to said handle bars 11 and 12. The outer ends or gripping portions 15 and 16 of the handle bars 11 and 12 will be bent outwardly to extend in transverse alignment.

A small gasoline motor 17 will be secured to the upper rear surface of the body 1 and will be provided with a gasoline tank 18 and a pulley 19 secured to the crankshaft 20. An air cleaner 21 and muffler 22 of usual construction will be attached to the engine or motor 17.

A gear housing 23 will be supported below the forward end of the body 1 in vertical position and will house the vertical cutter blade supporting shaft 24 upon which the worm 25 will be formed. A gear 26 secured to a transversely mounted shaft 27 will be disposed in the gear housing 23 in mesh with the worm 25, and the housing 23 will be packed with grease of a proper body.

The pulley 28 will be secured on the upper end of the vertical cutter blade supporting shaft 24 and will be connected with the pulley 19 on the engine crank shaft 20 by means of a belt 29. The centrally apertured cutter blade supporting plate 30 will be formed with a central portion from which three arms 31 extend outwardly at a tangent. A pair of openings 32 will be formed through each arm 31 to main bolts 33 which extend through the three interchangeable cutter blades 34 which are hooked as at 35 on their outer ends and are sharpened as at 36 on their outer edges. A nut 37 will be threaded on the threaded lower end of the shaft 24 for locking the blade supporting plate 39 and blades 34 in fixed position to rotate therewith.

The transverse shaft 27 will be mounted in the elongated bearing 38 and will support the pulley 39 on its outer end. A pulley 40 will be received to the transverse axle 8 and will be connected with and driven by the belt 41 connected between it and the pulley 39.

An arm 42 will be pivoted at 43 on the bottom of the body 1 and will support a belt tightening pulley 44 for engagement with the belt 41. The outer end of the arm 42 will be connected by means of the connecting rod 45 to the lever 46 pivoted at 47 to the handle bar 11, and a control rod 48 will be secured to the outer end of the lever 46 through the guide bracket 49 on the outer end of said handle bar. The outer end of the control rod 48 will be bent outwardly to form an operating handle 50 for tightening the belt tightener when it is driven to have the motor propel the grass and weed cutter. If desired, the cutter may be manually propelled, but the cutter blades will be power operated by the engine 17.

The transverse shaft or axle 8 will be supported in the bearings 51 on the bellcrank height adjusting levers 52 which are disposed on the opposite sides of the body 1, being pivoted at their forward ends as at 53, and having arcuate adjusting slots 54 in their rear ends for receiving the adjusting bolts 55.

From the foregoing description it will be seen that there has been devised and produced a highly efficient power operated and propelled rotating blade grass and weed cutter.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. A power operated and propelled rotated cutter apparatus including a skirted body, bellcranks pivotally carried by said body, means for locking said cranks, an axle supported at its opposing ends by said cranks, supporting wheels on said axle, a handle bar structure on said body, a prime mover mounted on said body, a cutter blade shaft rotatably mounted in said body, interchangeable cutter blades associated with said shaft, driving means between said prime mover and shaft, gearing associated with said shaft, a housing for said gearing, driving means for said axle associated with said gearing and a clutch associated with said last driving means for selectively operating the same.

2. The combination of claim 1, wherein said gearing includes a worm on said shaft, a shaft, a gear intermeshing with said worm and disposed on said shaft, a pulley on said shaft and drive transmission means from said pulley to the axle.

3. The combination of claim 1, wherein said clutch includes a belt tightener pivotally carried by the body adjacent said driving means for the axle.

VICTOR R. SWIFT.
MELVIN BOCKMAN.

REFERENCES CITED

The following references are of record in the file of this patent:

UNITED STATES PATENTS

| Number | Name | Date |
|---|---|---|
| 2,076,056 | Woodford | Apr. 6, 1937 |
| 2,192,762 | Vincze | Mar. 5, 1940 |
| 2,232,671 | Loder | Feb. 18, 1941 |